(12) United States Patent
Ho

(10) Patent No.: US 6,755,548 B2
(45) Date of Patent: Jun. 29, 2004

(54) BACKLIGHT MODULE

(75) Inventor: Yi-Chun Ho, Junghe (TW)

(73) Assignee: Quanta Display Inc., Tao Yuan Shien (TW)

( * ) Notice: Subject to any disclaimer, the term of this patent is extended or adjusted under 35 U.S.C. 154(b) by 0 days.

(21) Appl. No.: 10/243,262

(22) Filed: Sep. 13, 2002

(65) Prior Publication Data

US 2004/0032724 A1 Feb. 19, 2004

(30) Foreign Application Priority Data

Aug. 13, 2002 (TW) ........................................ 91118152 A

(51) Int. Cl.[7] .............................................. F21V 7/04
(52) U.S. Cl. .......................................... 362/31; 27/346
(58) Field of Search ............................. 362/31, 26, 27, 362/297, 346

(56) References Cited

U.S. PATENT DOCUMENTS

| | | | | |
|---|---|---|---|---|
| 5,618,095 A | * | 4/1997 | Kashima et al. | 362/31 |
| 6,181,391 B1 | * | 1/2001 | Okita et al. | 349/65 |
| 6,390,638 B1 | * | 5/2002 | Miller et al. | 362/31 |

* cited by examiner

*Primary Examiner*—Sandra O'Shea
*Assistant Examiner*—Ali Alavi
(74) *Attorney, Agent, or Firm*—Thomas, Kayden, Horstemeyer & Risley

(57) ABSTRACT

A backlight module for an LCD device. The backlight module includes a glass panel, a light guide plate and an illumination assembly. The backlight module provides an improved structure and arrangement of the illumination assembly. Thus, illumination of the LCD device is not adversely affected and the weight and thickness of the backlight module are reduced, as are the weight and thickness of the LCD device itself.

28 Claims, 4 Drawing Sheets

BACKLIGHT MODULE

BACKGROUND OF THE INVENTION

1. Field of the Invention

The present invention relates to a backlight module, and in particular to a backlight module reducing the thickness and weight of an LCD device.

2. Description of the Related Art

Referring to FIG. 1, a conventional backlight module 1 for an LCD device includes a glass panel 2, a light guide plate 4 and two symmetric illumination assemblies 6. A diffusing film (not shown) and a brightness enhancement film (not shown) are disposed on the glass panel 2. A reflecting film (not shown) is disposed under the light guide plate 4. The illumination assembly 6 has two lamps 6a, 6b arranged in a line and a reflector 6c. The lamps 6a, 6b transmit light to the light guide plate 4 directly. Also, the lamps 6a, 6b transmit light to the light guide plate 4 by reflection of the reflector 6c and the light is absorbed and diffused by a plurality of optical dots (not shown) formed on the bottom of the light guide plate 4.

Generally speaking, the diameter of the lamps 6a, 6b is 2.4 mm. The lamps 6a, 6b are spaced from each other by a predetermined distance such that light or light energy is not absorbed and illumination of the light guide plate 4 is not reduced. In addition, a predetermined distance exists between the lamp 6a and the reflector 6c and between the lamp 6b and the reflector 6c to ensure reflection. Thus, the thickness t1 of the light guide plate 4 of the conventional backlight module 1 is 8 mm.

Referring to FIG. 2, another conventional backlight module 10 provides a light guide plate having reduced thickness. Elements corresponding to those shown in FIG. 1 are given the same reference numerals, and explanation thereof will be omitted for simplification of the description. The backlight module 10 includes a glass panel 2, a light guide plate 4 and two symmetric illumination assemblies 6'. The illumination assembly 6' has two lamps 6a, 6b arranged obliquely and a reflector 6'c. Similarly, the diameter of the lamps 6a, 6b is 2.4 mm and the illumination of the light guide plate 4 in the backlight module 10 is the same as that in the backlight module 1. The thickness of the reflector 6'c can thus be reduced. Namely, the thickness t2 of the light guide plate 4 of the backlight module 10 is reduced to 6 mm.

Nevertheless, the aforementioned backlight modules 1, 10 are still overly thick (8 mm, 6 mm) though they maintain enough illumination.

Consequently, the invention provides a backlight module for an LCD device. The backlight module provides an improved structure of the illumination assembly and improved arrangement of the illumination lamps thereof. The illumination of the LCD device is not adversely affected and the weight and thickness of the backlight module are reduced, as are the weight and thickness of the LCD device itself.

SUMMARY OF THE INVENTION

An object of the invention is to provide a backlight module. The backlight module comprises a glass panel, a light guide plate and an illumination assembly. The light guide plate is disposed under the glass panel and has a connection side. The illumination assembly is disposed on the connection side of the light guide plate and has a reflector, a first lamp and a second lamp. The first lamp and the second lamp are enclosed by the reflector. The perpendicular distance from the first lamp to the connection side of the light guide plate is greater than that from the second lamp to the connection side of the light guide plate. The reflector is composed of a plurality of curved surfaces to reflect light from the first lamp and the second lamp to the light guide plate. Thus, the light guide plate and the illumination assembly feature reduced thickness.

Preferably, the reflector is composed of an oval surface, a first curved surface, a second curved surface, a third curved surface and a plane surface.

Preferably, the oval surface and the plane surface are connected to the connection side of the light guide plate.

Preferably, the first lamp is disposed within the first curved surface.

Preferably, the second lamp is disposed within the third curved surface.

Preferably, the first curved surface, the second curved surface and the third curved surface are further composed of a plurality of minor curved surfaces, respectively.

Preferably, a plurality of optical dots are formed on the bottom of the light guide plate for absorbing and diffusing the light input to the light guide plate.

Preferably, the reflector is made of stainless steel.

Preferably, the backlight module further comprises an optical film disposed under the light guide plate.

Preferably, the backlight module further comprises a diffusing film disposed on the glass panel.

Preferably, the backlight module further comprises a brightness enhancement film disposed on the diffusing film.

Preferably, the light guide plate is made of acrylic material.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
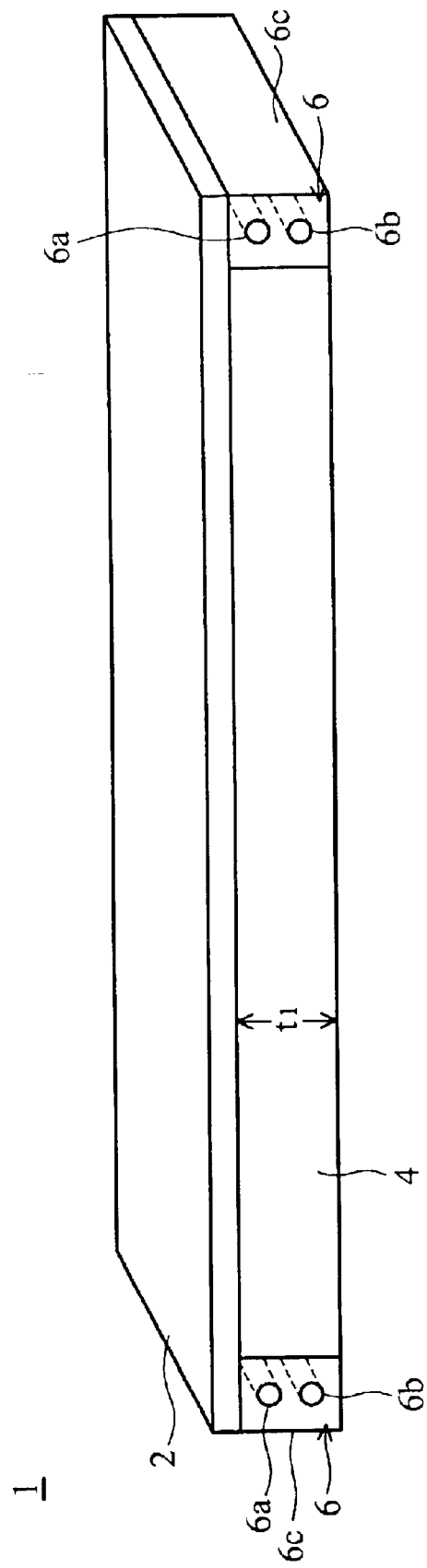
FIG. 1 is a schematic perspective view showing a conventional backlight module.
Figure 2:
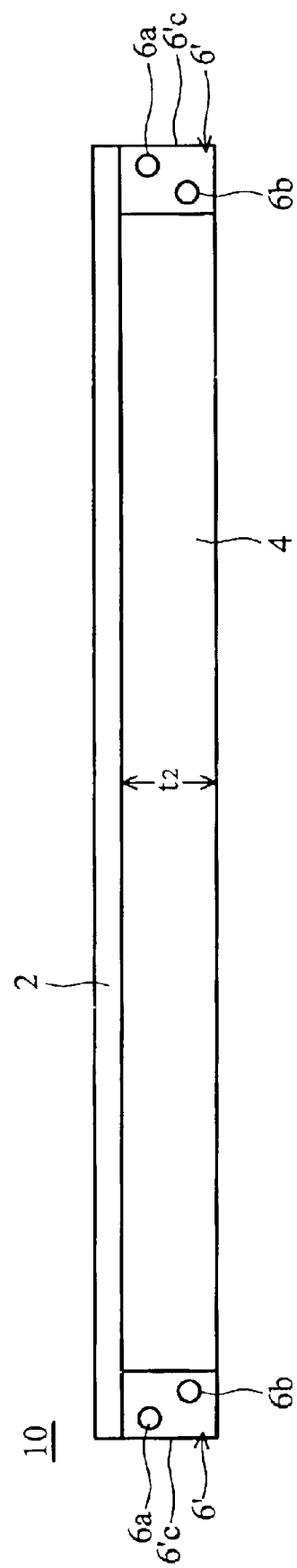
FIG. 2 is a schematic front view showing another conventional backlight module.
Figure 3:
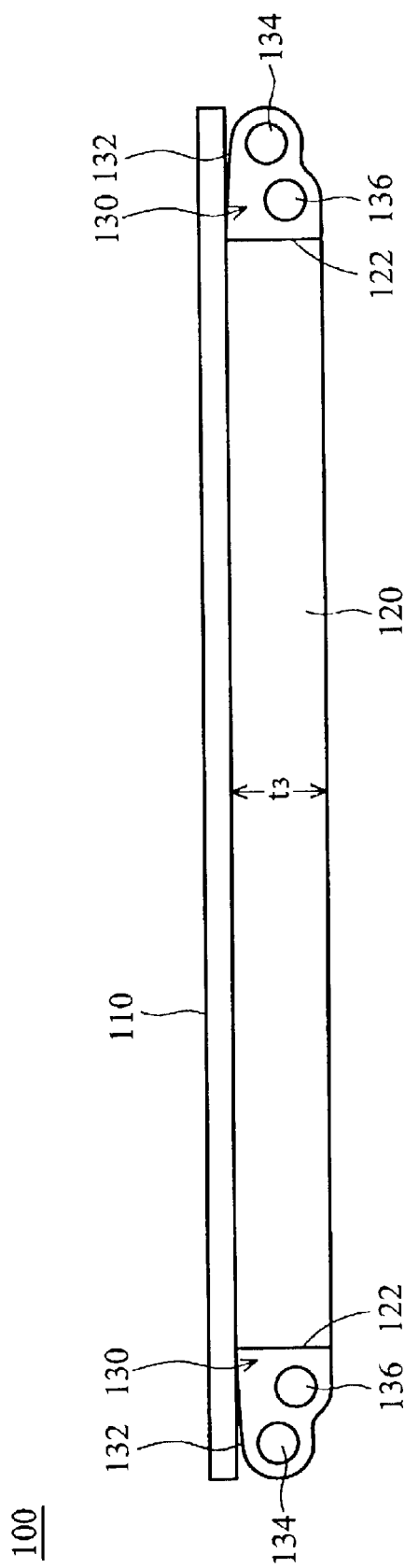
FIG. 3 is a schematic front view showing the backlight module of the invention.
Figure 4:
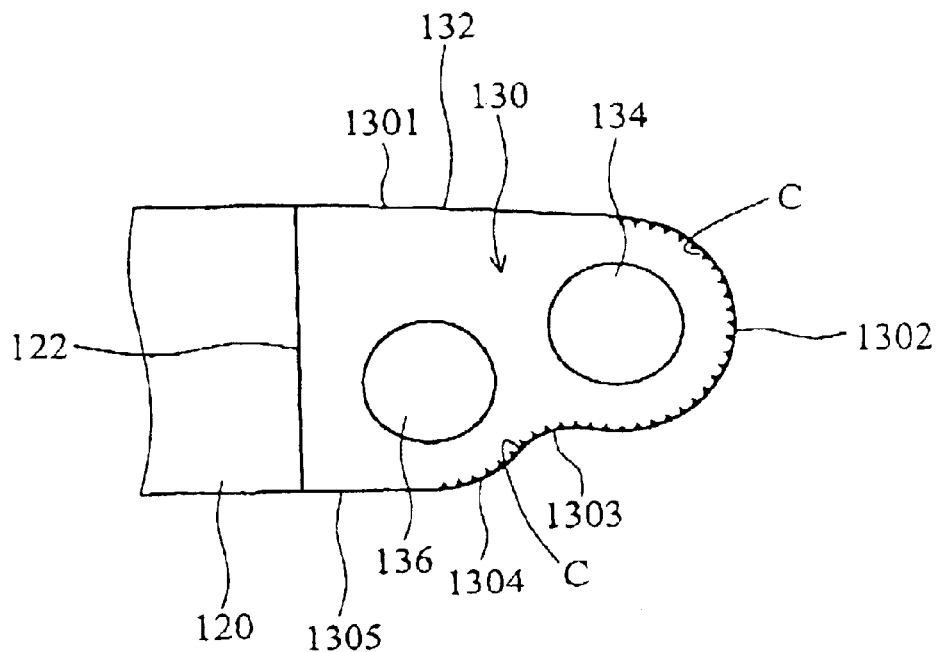
FIG. 4 is a schematic front view showing the illumination assembly according to FIG. 3.

According to experiments and tests, the present backlight module for an LCD device has a structure as shown in FIG. 3 and FIG. 4. Thus, the illumination of the backlight module is not adversely affected and the weight and thickness of the backlight module are reduced, as are the weight and thickness of the LCD device itself.

Referring to FIG. 3, the backlight module 100 comprises a glass panel 110, a light guide plate 120 and two illumination assemblies 130. The light guide plate 120 is disposed under the glass panel 110 and has two connection sides 122.

The two connection sides 122 are disposed on opposite sides of the light guide plate 120. The two illumination assemblies 130 are disposed on the two connection sides 122, respectively.

The backlight module 100 provides an improved structure of the illumination assembly 130 and an improved arrangement of the illumination lamps thereof. Thus, the thickness of the light guide plate 120 is reduced.

Referring to FIG. 4, the illumination assembly 130 has a reflector 132, a first lamp 134 and a second lamp 136. The diameter of the first lamp 134 and the second lamp 136 is 2.4 mm. The first lamp 134 and the second lamp 136 are enclosed by the reflector 132. The perpendicular distance from the first lamp 134 to the connection side 122 of the light guide plate 120 is greater than that from the second lamp 136 to the connection side 122 of the light guide plate 120. The reflector 132 is composed of a plurality of curved surfaces to reflect light from the first lamp 134 and the second lamp 136 to the light guide plate 120.

As shown in FIG. 4, the reflector 132 is composed of an oval surface 1301, a first curved surface 1302, a second curved surface 1303, a third curved surface 1304 and a plane surface 1305. The oval surface 1301 and the plane surface 1305 are connected to the connection side 122 of the light guide plate 120. The first lamp 134 is disposed within the first curved surface 1302 and the second lamp 136 is disposed within the third curved surface 1304.

Specifically, in this embodiment, the first curved surface 1302, the second curved surface 1303 and the third curved surface 1304 are further composed of a plurality of minor curved surfaces, respectively. Thus, the reflection of the reflector 132 is enhanced. Meanwhile, the oval surface 1301 also provides enhanced reflection. In addition, the reflector 132 is made of stainless steel (SUS 304) such that the aforementioned structure of the reflector 132 can be easily formed or manufactured.

Since the reflector 132 has the aforementioned structure, the illumination in the light guide plate 120 is not adversely affected. Furthermore, because of the improved arrangement and relative position of the first lamp 134 and the second lamp 136, the thickness of the illumination assembly 130 and the thickness t3 of the light guide plate 120 are reduced.

Figure 5:
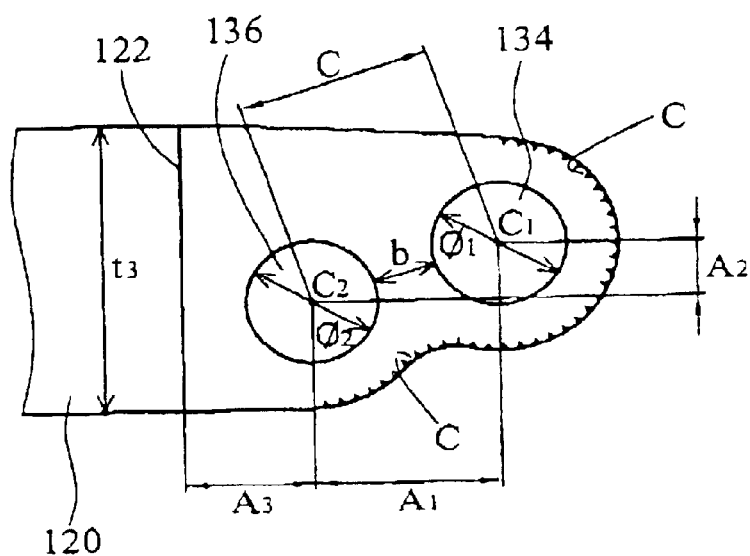
FIG. 5 shows the relation among the elements in the illumination assembly of the invention.

Referring to FIG. 5, $C_1$, $C_2$ are center positions of the first lamp 134 and the second lamp 136, respectively. $\phi_1$ $\phi_2$ are diameters of the first lamp 134 and the second lamp 136, respectively. $\phi_1=\phi_2=2.4$ mm. The relations among the elements of the backlight module 100 are calculated as follows:

$C=2.86\sim2.88$ mm;

$b=1.0\sim1.2$ mm;

$A_1=2.71\sim2.75$ mm;

$A_2=0.91\sim0.95$ mm;

$A_3=1.0\sim1.5$ mm.

In this embodiment, the thickness t3 of the light guide plate 120 is 4 mm, much less than t1 (8 mm) and t2 (6 mm) of the conventional light guide plate 4. According to the experiments and measurement, the illumination of the light guide plate 120 is not reduced. Thus, the illumination assembly 130 provides the light guide plate 120 with an enormously reduced thickness, such that the thickness of the LCD device is likewise reduced tremendously.

The object of the invention is to reduce the thickness of the backlight module while maintaining illumination. In order to overcome the drawbacks of the conventional illumination assembly having two lamps arranged in a line, the invention provides the illumination assembly 130 having two lamps arranged obliquely. Meanwhile, the relative distances among the elements of the illumination assembly 130 are measured accurately to obtain the present backlight module.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:

a glass panel;

a light guide plate disposed under the glass panel and having a connection side; and an illumination assembly disposed on the connection side of the light guide plate and having a reflector, a first lamp and a second lamp, the first lamp and the second lamp enclosed by the reflector, wherein the perpendicular distance from the first lamp to the connection side of the light guide plate is greater than that from the second lamp to the connection side of the light guide plate, and the reflector is composed of a plurality of curved surfaces to reflect light from the first lamp and the second lamp to the light guide plate.

2. The backlight module as claimed in claim 1, wherein the reflector comprises an oval surface, a first curved surface, a second curved surface, a third curved surface and a plane surface.

3. The backlight module as claimed in claim 2, wherein the oval surface and the plane surface are connected to the connection side of the light guide plate.

4. The backlight module as claimed in claim 2, wherein the first lamp is disposed within the first curved surface.

5. The backlight module as claimed in claim 2, wherein the second lamp is disposed within the third curved surface.

6. The backlight module as claimed in claim 2, wherein the first curved surface, the second curved surface and the third curved surface are further composed of a plurality of minor curved surfaces, respectively.

7. The backlight module as claimed in claim 1, wherein a plurality of optical dots are formed on the bottom of the light guide plate for absorbing and diffusing the light input to the light guide plate.

8. The backlight module as claimed in claim 1, wherein the reflector is made of stainless steel.

9. The backlight module as claimed in claim 1, further comprising an optical film disposed under the light guide plate.

10. The backlight module as claimed in claim 1, further comprising a diffusing film disposed on the glass panel.

11. The backlight module as claimed in claim 1, further comprising a brightness enhancement film disposed on the diffusing film.

12. The backlight module as claimed in claim 1, wherein the light guide plate is made of acrylic material.

13. A backlight module, comprising:

a glass panel;

a light guide plate disposed under the glass panel and having at least one connection side; and at least one illumination assembly disposed on the connection side of the light guide plate and having at least one lamp and a reflector, the lamp enclosed by the reflector, wherein the reflector is composed of a plurality of curved surfaces to reflect light from the lamp to the light guide plate, and the thickness of the illumination assembly is not greater than that of the light guide plate.

14. The backlight module as claimed in claim 13, wherein the reflector comprises an oval surface, a first curved surface, a second curved surface, a third curved surface and a plane surface.

15. The backlight module as claimed in claim 14, wherein the oval surface and the plane surface are connected to the connection side of the light guide plate.

16. The backlight module as claimed in claim 14, wherein the illumination assembly further comprises a first lamp disposed in the first curved surface.

17. The backlight module as claimed in claim 14, wherein the illumination assembly further comprises a second lamp disposed in the third curved surface.

18. The backlight module as claimed in claim 14, wherein the first curved surface, the second curved surface and the third curved surface are further composed of a plurality of minor curved surfaces, respectively.

19. The backlight module as claimed in claim 13, wherein the reflector is made of stainless steel.

20. The backlight module as claimed in claim 13, wherein the light guide plate is made of acrylic material.

21. A backlight module, comprising:

a glass panel;

a light guide plate disposed under the glass panel and having at least one connection side; and at least one illumination assembly disposed on the connection side of the light guide plate and having at least one lamp and a reflector, the lamp enclosed by the reflector, wherein the reflector is composed of an oval surface, a first curved surface, a second curved surface, a third curved surface and a plane surface to reflect light from the lamp to the light guide plate.

22. The backlight module as claimed in claim 21, wherein the reflector comprises an oval surface, a first curved surface, a second curved surface, a third curved surface and a plane surface.

23. The backlight module as claimed in claim 22, wherein the oval surface and the plane surface are connected to the connection side of the light guide plate.

24. The backlight module as claimed in claim 22, wherein the illumination assembly further comprises a first lamp disposed in the first curved surface.

25. The backlight module as claimed in claim 22, wherein the illumination assembly further comprises a second lamp disposed in the third curved surface.

26. The backlight module as claimed in claim 22, wherein the first curved surface, the second curved surface and the third curved surface are further composed of a plurality of minor curved surfaces, respectively.

27. The backlight module as claimed in claim 21, wherein the reflector is made of stainless steel.

28. The backlight module as claimed in claim 21, wherein the light guide plate is made of acrylic material.

\* \* \* \* \*